United States Patent [19]
Maranon

[11] Patent Number: 6,076,944
[45] Date of Patent: Jun. 20, 2000

[54] HORTICULTURE ILLUMINATION SYSTEM WITH INTEGRATED AIR FLOW COOLING

[76] Inventor: David Nelosn Maranon, 31 Devonshire Dr., Novato, Calif. 94947

[21] Appl. No.: 09/179,475

[22] Filed: Oct. 27, 1998

[51] Int. Cl.[7] .................................................. F21S 3/00
[52] U.S. Cl. ......................... 362/294; 362/295; 362/310
[58] Field of Search ................................. 362/294, 295, 362/310

[56] References Cited

U.S. PATENT DOCUMENTS

| | | | |
|---|---|---|---|
| 3,869,605 | 3/1975 | Davis | 240/47 |
| 4,681,024 | 7/1987 | Ivey | 98/34.6 |
| 4,796,169 | 1/1989 | Shemitz | 362/282 |
| 4,998,188 | 3/1991 | Dehelmann | 362/147 |
| 5,213,413 | 5/1993 | Weathers | 362/431 |
| 5,217,298 | 6/1993 | Jackson et al. | 362/226 |
| 5,432,690 | 7/1995 | Van Der Vliet et al. | 362/217 |

*Primary Examiner*—Cassandra Spyrou
*Assistant Examiner*—Mohammad Y. Sikder
*Attorney, Agent, or Firm*—Leland K. Jordan

[57] ABSTRACT

A horticulture lighting system with at least two light tubes mounted in opposite directions within a hollow column to produce a 360-degree field of substantially parallel radiant energy. The column is adapted with a cooling air flow across the light tubes and a protective lens.

14 Claims, 5 Drawing Sheets

HORTICULTURE ILLUMINATION SYSTEM WITH INTEGRATED AIR FLOW COOLING

BACKGROUND OF THE INVENTION

1. Field of the Invention

The present invention relates generally to a horticulture illumination system for use in growing plants and the like. In particular, the present invention provides an illumination system adapted with a plurality of vertically oriented light tubes so as to accommodate growing plants of different heights and having a cooling system integrated thereto.

2. Description of the Related Art

Horticulture growing systems are becoming an increasingly significant factor in the production of foodstuffs, flowers and decorative plants. Such growing systems generally include growing stations wherein plant roots are maintained in a sterile media. Nutrients, generally in water based solution, are provided to the roots, and radiation is supplied in to the plants from an illumination system with radiation in a range of wavelengths chosen to optimize plant growth. Illumination systems used within the horticulture industry vary widely in their basic design depending on such factors as the size and type of plants being produced and the general size of the growing facility. Most horticulture illumination systems employ a plurality of light sources, distributed in an array mounted at some distance over the plant's growing area. Overhead light sources tend to provide a cone of light directed downwards with the radiation intensity falling off from the center of the cone's circumference. Overhead lighting encompass each source of light to provide a generally uniform field of radiation that is vertically incident upon the underlying planar array of plants. Such systems are generally affixed to a structural ceiling and are cumbersome to relocate. Overhead lights require automated conveyors using chains and motors to relocate over different portions of a planting area in order to produce an even growing rate.

Another style of horticulture illumination systems employs a single point ground-level light source whose rays radiate in a full or partial arc with an intensity that decreases with distance above ground. Consequently, the amount of radiant energy available to a growing plant varies throughout the plant's height. A problem related to known ground-level illumination systems is a non-uniform light intensity incident upon plants as they increase in height during a full growing cycle.

Horticulture illumination systems typically do not employ cooling systems for individual light sources, but instead rely upon a universal cooling system to eliminate unwanted increases of temperature within the growing facility. These cooling systems tend to deposit dust or the like upon the exterior surfaces of the light source thereby decreasing the intensity of radiation transmitted to the growing plants.

U.S. Pat. No. 5,217,298 discloses a lighting system comprising a free-standing base supporting a track lighting strip in a substantially vertical position. Lighting elements may be positioned at any point along the track lighting strip. Spacer tubes and protective elements cover and enclose the track lighting strip.

U.S. Pat. No. 5,213,413 discloses an integral light and support to provides illumination in areas where temporary lighting is desirable and elongate members such as studs or joists are readily available. The light and support may be suspended from a flat wall having nails protruding from the surface through attachment to nail grooves provided. The integral light and support has a light housing that is pivotable and rotatable to direct the light in a variety of different areas without movement of the entire light and support.

U.S. Pat. No. 4,998,188 provides a wall-mounted lighting unit for creating a visual environment which is conductive to general care lighting and which requires both vertical lighting and brightness control. The lighting unit utilizes a prism design in a refractor which forms a portion of the bottom surface of the housing to provide horizontal illumination and internal linear optics for vertical illumination of the subject.

U.S. Pat. No. 4,796,169 provides for a lighting fixture is provided which includes a rotatable lamp and reflector system that can be adjusted to direct its maximum candlepower at a desired vertical angle. The lighting fixture also includes a rotatable glare shield that can be adjusted to vary the height of the top of the shield to change the degree of shielding provided.

From the discussion of the above art, it can be seen that there is a need for an improved horticulture illumination system for generating relatively uniform illumination as plants mature, and increase in height, that also overcomes or minimizes the above-mentioned problems associated with cooling requirements or structural rearranging.

SUMMARY OF THE INVENTION

A horticulture illumination source is provided having means for emitting parallel light rays over an easily expandable vertical distance. This minimizes variations in the amount of radiant energy provided to the plants as they increase in height. Accordingly, in one aspect of this invention, an illumination system is provided comprising a plurality of individual vertically-oriented light sources. Further, in order to illuminate the surface of the object with light rays parallel to the above-mentioned axis, the vertical light source is provided with a lens mounted to generate substantially parallel light rays.

It has been further found that a cooling system adapted to first contain the convection heat energy generated by the light sources and to then remove heat energy by means of an air flow that is confined to the area of the illumination source is highly efficient.

Other objects, features and advantages will be made apparent during the course of the following description of a preferred embodiment of the present invention.

DETAILED DESCRIPTION OF THE INVENTION

Figure 1:
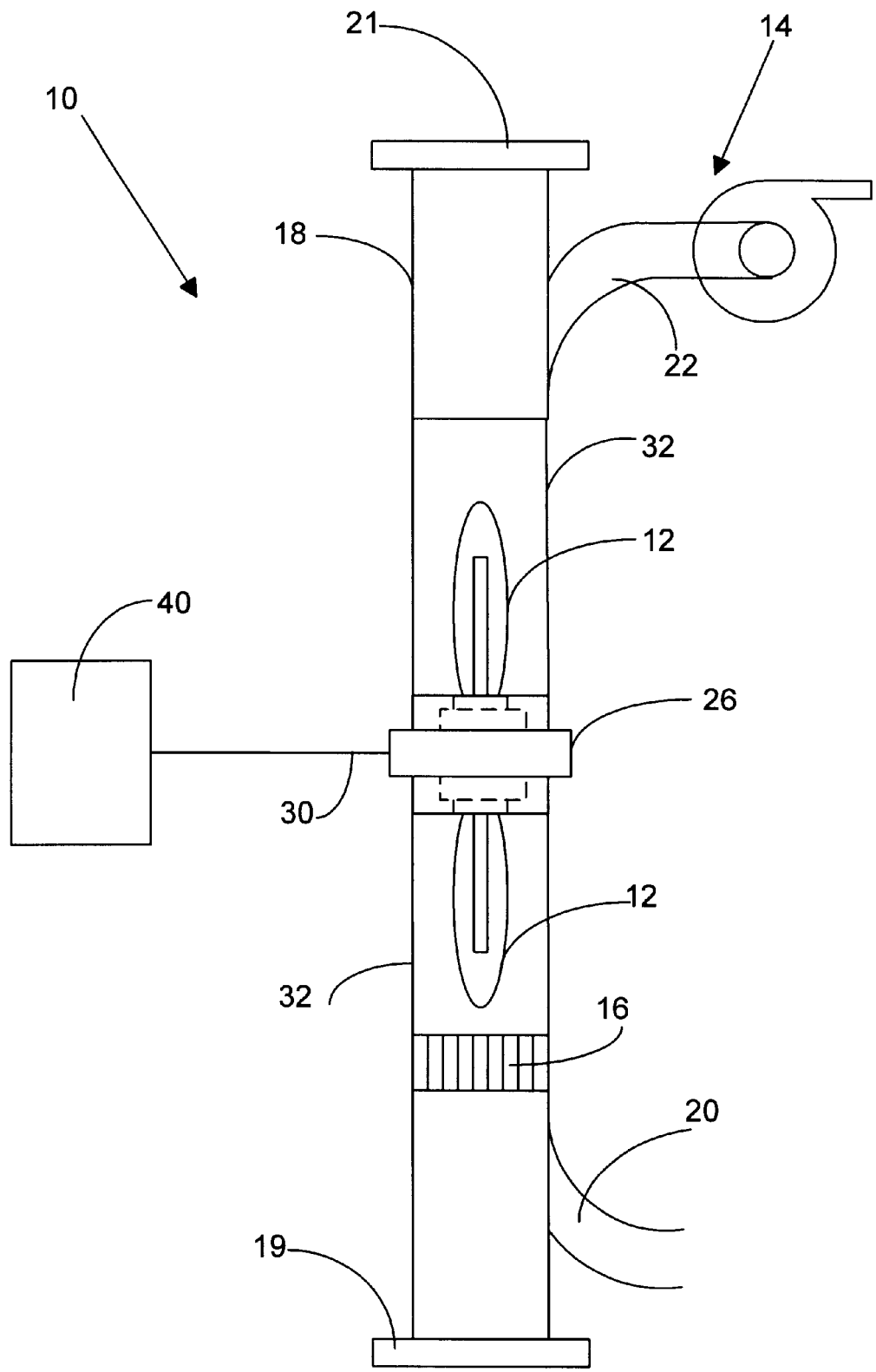
FIG. 1 is an elevation view of an illumination system of the present invention incorporating a pair of light sources.

Referring now to the drawings wherein like reference numerals refer to like components in the various views, FIG. 1 is an elevation view of an illumination system 10 according to the present invention comprising a pair of vertically mounted light tubes 12, convection cooling means 14, preferably taking the form of a source of a colurmnar flow of air surrounding light tubes 12, and filtering means 16 to remove unwanted particulate matter from the flow of air. Cooling means 14 comprises an air flow channel or tunnel 18 encompassing the light tubes 12, the channel 18 having an air inlet portion 20, an air outlet portion 22, and an air pumping fan 24 adapted to generate reduced air pressure within outlet portion 22. The lowermost portion of channel 18 is fully closed by a bottom plate 19 and the uppermost portion of channel 18 is fully closed by a top plate 21. Channel 18, air inlet portion 20, air outlet portion 22, and air pumping fan 24 cooperate to provide a flow of cooling and filtered air across light tubes 12 in the area of column 18 between the air inlet portion 20, and the reduced air pressure at air outlet portion 22. Preferably filtering means 16 is positioned between the air inlet portion 20 and light tubes 12 so that only filtered cooling air passes over the surfaces of tubes 12. A mounting tray 28 is disposed between two similar sections of the generally clear, circular portions 32 of column 18 and mounts two light tubes 12 in a vertically opposed orientation as discussed hereinbelow. A suitable power source 40 is electrically connected to light tubes 12. Bottom plate 19 is suitable for supporting the air flow channel 18 on a floor in a vertical free-standing orientation; alternately, top plate 21 may be fitted with a hook for supporting the air flow channel 18 from an overhead structure like a ceiling in a vertical suspended orientation.

Light tubes 12 are enclosed in the generally clear, circular portions 32 of column 18 comprising a generally transparent material such as Lucite® plastic having a thickness of about ⅛ inch so as to produce a transparent hollow channel or tube section 32. Other generally transparent materials like high temperature glass and polycarbonate may also be used to construct portion 32. Similarly, other geometric shapes may be used in construction of column 18 and the transparent portions 32 of column 18 in alternate embodiments of the present invention. Rectangular and hexagonal shaped clear portion 32 and column 18 are such alternate embodiments.

Figure 2:
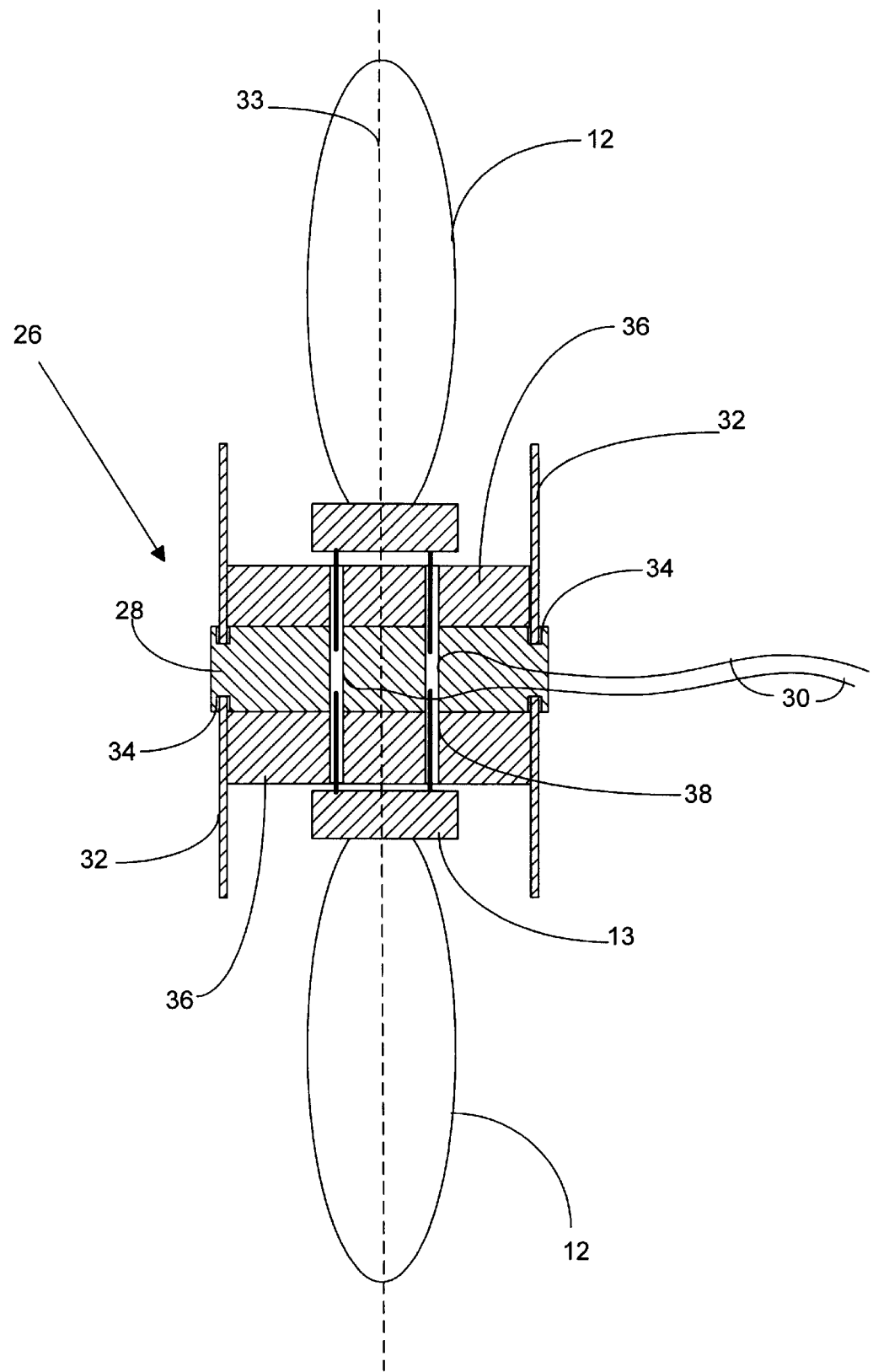
FIG. 2 is a cross-sectional view of a mounting tray suitable for use with the illumination system of FIG. 1.

As shown in FIG. 2, mounting assembly 26 is adapted to be mounted and secured in a mating placement over the diameter of the generally circular transparent portions 32 so that the vertical axis 33 of the light tubes 12 is positioned in alignment with the axial diameter of the columns 32. Various methods may be used to accomplish this opposed tube mounting design, an exemplary scheme employing a pair of circumferential grooves 34 on opposite sides of and near the outer diameter of a mounting tray 28 and sized to accept the transparent portions 32 of column 18. A pair of support disks 36 having an outer diameter selected to produce an interference fit with the inner diameter of generally circular transparent portions 32 are mounted against tray 28 to provide structural integrity of the lighting system 10. Electrical connections from an appropriate power source 40 to tubes 12 may be made using sockets 38 formed within tray 28 and disks 36 to secure tubes 12 to tray. Wiring 30 is connected to sockets 38 and to power source 40 so as to provide tube lighting voltage appropriate for the types of light tube 12 being used.

In one exemplary embodiment, tubes 12 are of the high pressure sodium type that produce a reddish spectrum of light which is known to maximize the growing rate of most edible plants. In another exemplary embodiment, tubes 12 are of the metal halide type that produce a bluish spectrum of light which is known to maximize the growing rate of most flowering plants. High pressure sodium tubes and metal halide light tubes like those described before are commercially available with different output ratings in a range from 250 to 1000 watts from vendors like Phillips, Osram/Sylvania, and General Electric.

As shown in FIG. 2, mounting assembly 26 comprises a removable mounting tray 28 and electrical connection means 30 and serves to fixedly mount and electrically connect the bases 13 of light tubes 12 so that two different light tubes 12 are vertically aligned with one another with their bases 13 juxtaposed, each of the two light sources pointing away from the mounting tray in opposing directions. In an exemplary embodiment, light tubes 12 have a generally cylindrical shape of about four inches diameter and about twelve inches length. Such bulbs are available as either metal halide or high pressure sodium light tubes, for example metal halide model numbers MH 400 and 100 or high pressure sodium model numbers HPS 400, 430, 600 and 1000 produced by Phillips.

Figure 3:
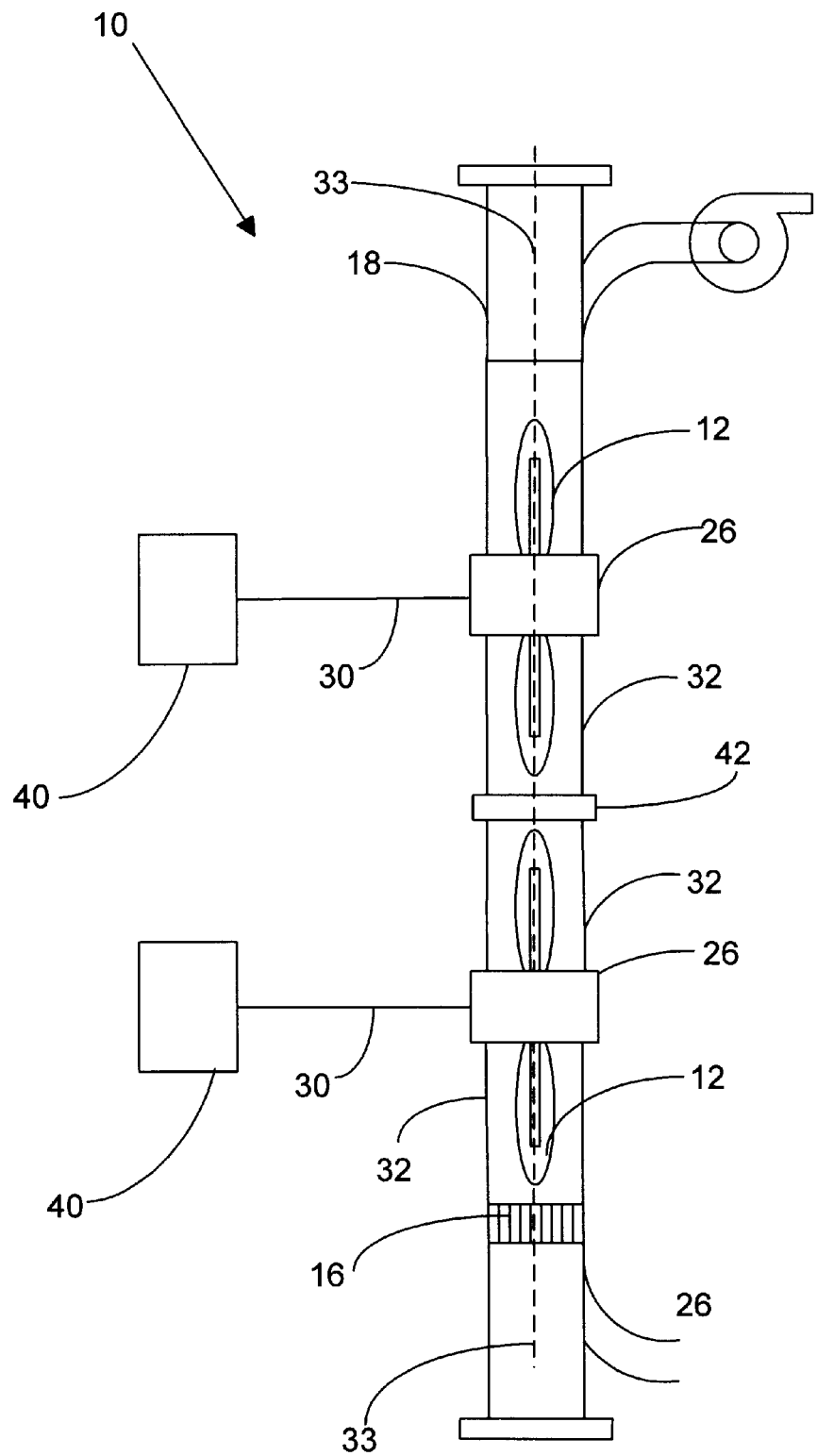
FIG. 3 is an elevation view of an illumination system of the present invention incorporating a plurality of light sources in the illumination apparatus of FIG. 1.

Referring now to FIG. 3, an alternate embodiment of the present invention is illustrated in which a second column 18 is secured, for purposes of description only, beneath the first column 18 in vertical alignment thereto using a suitable hollow collar 42. As described above for the first column 18, a second mounting assembly 26 and second electrical connection means 30 are mounted and secured within third and fourth generally transparent portions 32. This second mounting tray 28 serves to fixedly mount and electrically connect the base of an additional pair of light tubes 12 vertically aligned with one another with their bases juxtaposed so that the two light sources point away from the second mounting tray 28 in opposing directions with the axes 33 of the light tubes 12, mounting assemblies 26, generally transparent portions 32, and columns 18 generally vertically aligned.

Figure 4:
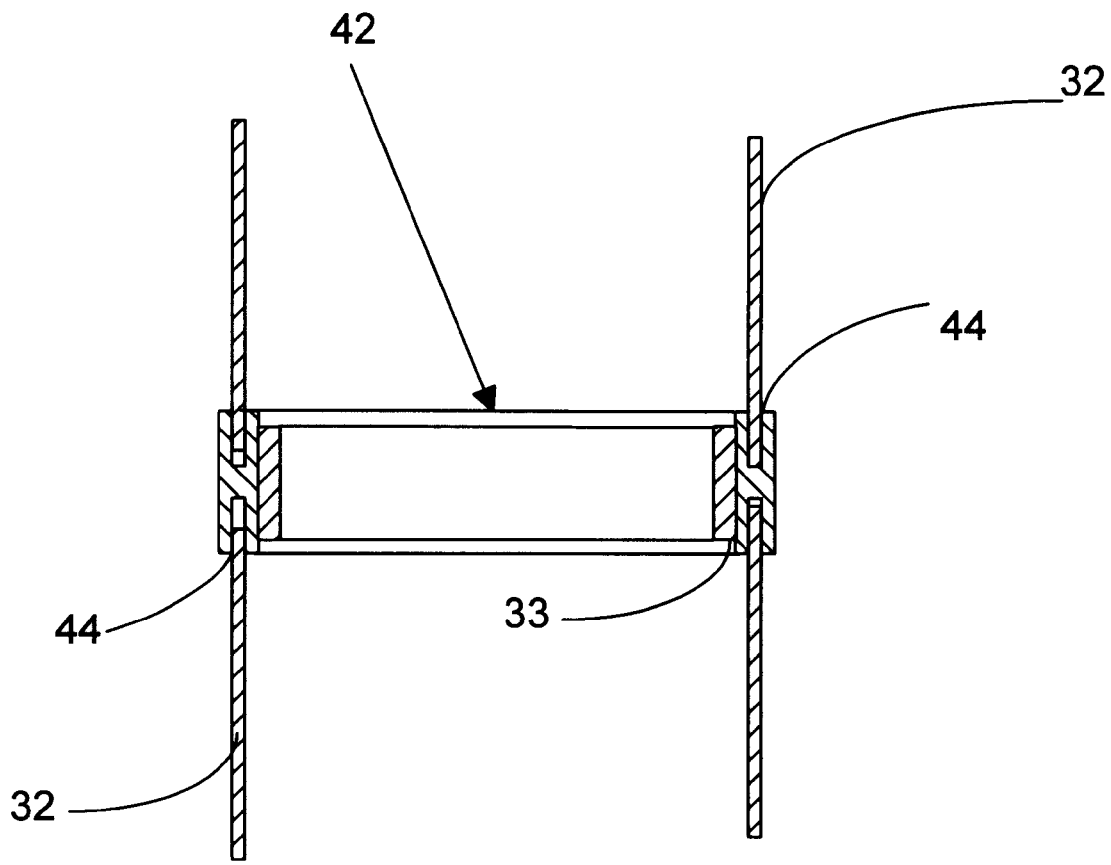
FIG. 4 is an elevation view of an illumination system of the present invention according to FIG. 3 illustrating the illumination of various height plants.

In this embodiment, a hollow mounting collar 42 like that shown in FIG. 4 may be mounted and secured in a mating placement over the diameter of the generally circular transparent portions 32, collar 42 employing a pair of circumferential grooves 44 sized to accept and support cylinders 32 in stationary alignment with one another. A pair of hollow support disks 43 having an outer diameter selected to produce an interference fit with the inner diameter of generally circular transparent portions 32 may be attached to collar 42 to provide structural integrity of the lighting system 10. Further in this embodiment, the uppermost portion of the lower second column 32 serves as the air inlet portion to the lowermost portion of the upper first column 32. The filtering means 16 is positioned between the air inlet portion 20 of the lower second column and tubes 12 so that only filtered cooling air passes over the surfaces of tubes 12.

The second mounting tray 28 is displaced a distance from the first mounting tray 28 selected so that light tubes 12 mounted in the first and second mounting trays 28 are not impacted with one another. In this alternate embodiment, it is possible to achieve a vertically variable spectrum of light by using metal halide light tubes 12 in, for example, the first mounting tray 28 and using high pressure sodium light tubes 12 in the second mounting tray 28. With this arrangement, when plants are smallest in the earliest portion of their growing cycle, plants are initially exposed to the bluish spectrum of light from a metal halide tube 12. In a later portion of their growing cycle, when plants are larger, plants may be exposed to the reddish spectrum of light from a high-pressure sodium light tube 12. This change from the bluish spectrum of a metal halide light tube 12 to the reddish spectrum of a high pressure sodium tube 12 part way through a growing cycle has been found to maximize the growing rate of most edible plants. It would of course be possible to use metal halide and high pressure sodium tubes 12 in a single mounting tray 28 however this requires different ballasts and therefore different electrical connection be made to the different light tubes 12.

Figure 5:
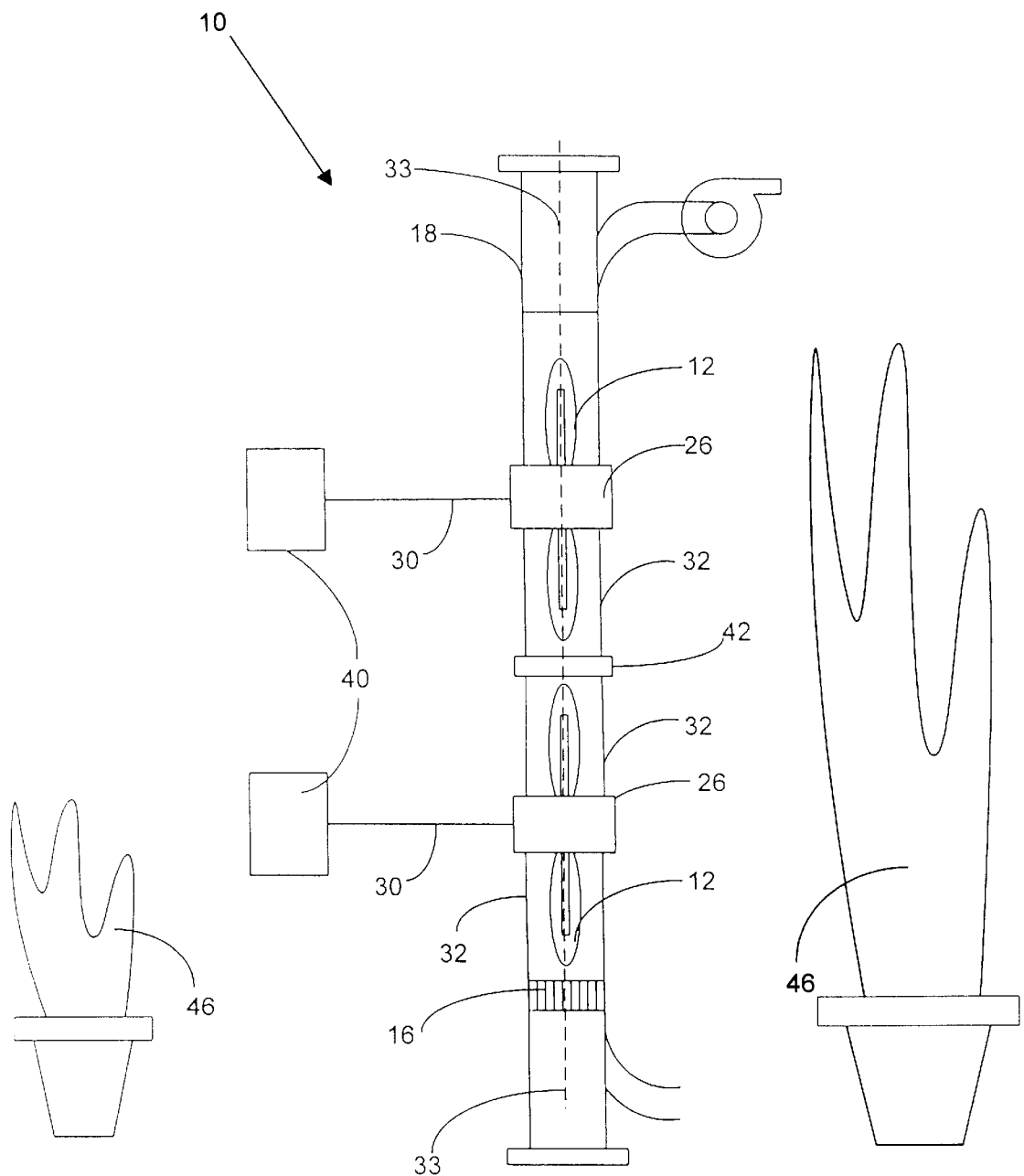
FIG. 5 is a horticulture lighting system of the present invention.

Referring now to FIG. 5, the horticulture lighting system 10 of the present invention is shown in operation with a pair of plants 46 disposed nearby, the light tubes connected to a light tube power source 40 adapted with means for controlling the operation of the power source. Light tube power source 40 may be equipped with various power timing programs to supply different intervals of light from the tubes 12 to plants 46 depending upon the kind of plant being grown. For example, hops grow best when exposed to a power on lighting cycle of 12 hours followed by a power off lighting cycle of 12 hours. In contrast, tomato plants grow best when exposed to a power on lighting cycle of 18 hours followed by a power off lighting cycle 6 hours.

In order to facilitate use of different types of light tubes 12, for example if a change from metal halide to high pressure sodium tubes 12 is desired part way through a growing cycle, a switchable ballast 42 may be incorporated within power source 40 and also controlled automatically or by a manual switch. Such an arrangement permits the use of different tube types.

It is to be understood that the above description is merely exemplary rather than limiting in nature, the invention being limited only by the appended claims. Various modifications and changes may be made thereto by one of ordinary skill in the art which will embody the principals of the invention and fall within the spirit and scope thereof.

What is claimed is:

1. A horticulture lighting system for illuminating a plurality of plants, the system comprising:
    a hollow vertical column extending upwardly and having lower, central and upper portions, an air inlet port formed in its lower portion and an air outlet port formed in its upper portion, said central portion of the column having a first mounting tray for mounting light emitting tubes and said central portion comprising a generally transparent material;
    a cooling fan connected to the outlet port and is generating a flow of cooling air across said light tubes in an area of said column between the air inlet port and the air outlet port, and;
    sad first mounting tray having light tube mounting means and electrical connections, the first tray horizontally disposed generally within the central portion of the column;
    one of said light emitting tubes electrically connected to and vertically mounted in a first direction upon said first tray; and,
    one of said light emitting tubes electrically connected to and vertically mounted in a second direction upon said first tray, the first and second directions being vertical and mutually opposite to one another.

2. The horticulture lighting system of claim 1 wherein said transparent portion of said column comprises plastic or glass.

3. The horticulture lighting system of claim 1 wherein said column includes an air filter mounted between the inlet port and the outlet port.

4. The horticulture lighting system of claim 1 wherein said column includes an air filter mounted between the inlet port and light tubes.

5. The horticulture lighting system of claim 1 further comprising a light tube power source.

6. The horticulture lighting system of claim 4 wherein the light tube power source further comprises light controlling means for controlling the power on and power off operation cycles of the power source.

7. The horticulture lighting system of claim 4, wherein said light controlling means further comprises a switchable ballast.

8. The horticulture lighting system of claim 7, wherein said switchable ballast is alternately suitable for high pressure sodium light tubes or metal halide light tubes.

9. The horticulture lighting system of claim 1, wherein said tubes are either metal halide or high pressure sodium light tubes.

10. The horticulture lighting system of claim 1, wherein both the hollow column and the portion of the column comprising a generally transparent material have a generally circular, rectangular or hexagonal shape.

11. The horticulture lighting system of claim 1 further comprising a second hollow column extending upwardly and having lower, central and upper portions, an air inlet port formed in its lower portion with at least one portion of the second column comprising a generally transparent material;
    a second mounting assembly having a light tube mounting tray and electrical connections, the second tray horizontally disposed generally within the central portion of the second column;
    a third light emitting tube electrically connected to and vertically mounted in the first direction upon said second tray;
    a fourth light emitting tube electrically connected to and vertically mounted in the second direction upon said second tray; and,
    a mounting collar adapted to secure the second column to the first column so that the axes of all light tubes, first and second mounting assemblies, generally transparent portions, and first and second columns are generally vertically aligned.

12. The horticulture lighting system of claim 11 wherein uppermost two light bulbs comprise sodium halide lights and wherein the lowermost two light bulbs comprise metal halide lights.

13. The horticulture lighting system of claim 1 further comprising a bottom plate suitable for supporting the air flow channel on a floor in a vertical free-standing orientation.

14. The horticulture lighting system of claim 1 further comprising a top plate for supporting the air flow channel from an overhead structure in a vertical suspended orientation.

* * * * *